Patented Sept. 11, 1945

2,384,683

UNITED STATES PATENT OFFICE 2,384,683

GRINDING WHEELS

Samuel S. Kistler, West Boylston, Mass., assignor to Norton Company, Worcester, Mass., a corporation of Massachusetts No Drawing. Application May 31, 1940,
Serial No. 338,039

14 Claims. (Cl. 51—298)

The invention relates to grinding wheels having organic bond.

One object of the invention is to provide a resilient grinding wheel. Another object of the invention is to provide a rigid grinding wheel of superior qualities for certain snagging operations. Another object of the invention is to provide a grinding wheel for snagging operations of longer life without loss of quality as determined by wheel wear and material removed. Another object of the invention is to provide a bond for grinding wheels having some of the characteristics of natural rubber without its variations in quality. Another object of the invention is to provide a bond for grinding wheels having high heat resistance.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I have found that polymeric butadiene with sulphur makes an excellent bond for abrasive grains to form grinding wheels having some of the characteristics of rubber but many superior features. I have also found that copolymers of butadiene and acrylic nitrile with sulphur are useful for this purpose. Methyl acrylic nitrile may be substituted for acrylic nitrile. I have further found that the copolymer of butadiene and styrene is useful for the manufacture of grinding wheels.

Butadiene is a hydrocarbon of the formula,

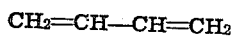

Butadiene is considered to polymerize in a linear chain. Acrylic nitrile may be also termed vinyl cyanide and is written,

Methyl acrylic nitrile may be written,

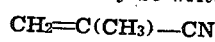

and has properties similar to acrylic nitrile. It may be termed methyl vinyl cyanide. Styrene is written,

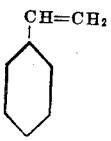

and may be termed vinyl benzene. Thus all three of acrylic nitrile, methyl acrylic nitrile and styrene have a vinyl or a substituted vinyl group. These substances link together with butadiene in the chains and together form a linear polymer. When sulphur is added, however, and the compound is vulcanized, there is a cross linking more or less, depending upon the amount of sulphur used. The butadiene polymers, whether butadiene alone or combined with acrylic nitrile, methyl acrylic nitrile or styrene, are thermoplastic until vulcanized with sulphur. When so vulcanized, they have more or less rigidity, depending upon the amount of sulphur incorporated into the mix. All of these substances are compatible with natural rubber and may be vulcanized with it to form a resilient or soft rubbery substance or a hard ebonite-like substance, depending upon the amount of sulphur used. The polymerization or copolymerization with sulphur is achieved by the use of heat and may be termed vulcanizing.

The polymers of butadiene and the copolymers of butadiene are collectively known by the trademark "Buna" synthetic rubber, the copolymer of butadiene and styrene has been known under the trade-mark "Buna S" and a copolymer of butadiene and acrylic nitrile is known by the trade-mark "Perbunan." This may be mixed with sulphur and abrasive grains on the mill, formed into sheets from which blanks can be died out, pressed and vulcanized to form grinding wheels. The preferred procedure is as follows:

"Perbunan," which comes in the form of rubbery chunks like smoked sheets pressed together, is passed between heavy mill rolls to plasticize it and thus also to condition it better for the reception of other ingredients including the abrasive grain and as this is done the required amount of sulphur, filler, accelerator and abrasive is added, the mixture being passed back and forth between the rolls to break down or further plasticize the Perbunan and mix it thoroughly with the other substances. When the abrasive mix thus bing worked becomes plastic and workable according to the standards known for the manufacture of rubber bonded grinding wheels, a quantity of the mixture is pased between a pair of rolls set closely together to form a sheet out of the plastic abrasive mix, blanks are died out of the sheeted abrasive mix, a number of the blanks placed in a mold, the mold is placed in a hot press, and the abrasive-containing mass in the mold is vulcanized therein. As a specific example of the foregoing, I may make an abrasive mix in the manner described, of the following ingredients:

*Example I*

| Ingredient | Parts by weight |
|---|---|
| Abrasive (e. g., $Al_2O_3$ or SiC) | 200 |
| "Perbunan" | 100 |
| Sulphur | 3 |
| "Spheron" black (finely divided carbon) | 70 |
| "Altax" (disulphide of mercapto benzo thiosol) | 1.5 |
| Dibutyl amine | .25 |
| Zinc oxide | 5 |
| Stearic acid | 1.5 |
| Coal tar | 5 |
| Rosin | 5 |

In the foregoing the abrasive may be in any grit size desired, depending upon the proposed use for the grinding wheel. The carbon in comminuted form ("Spheron" black) is a filler such as has been used for certain rubber products but in compounding a satisfactory bond out of the "Buna" synthetics to make a resilient grinding wheel, I employ the finely divided carbon to give the vulcanized material a grain-holding strength which it would not have without it if vulcanized to the desired resiliency, and as indicated in the above example, I preferably employ it in relatively high ratio to the synthetic (70 to 100, in the illustration), and it contributes materially toward giving the final resilient bonded abrasive product strength characteristics later described and also makes the bonded abrasive product relatively stiff and tough. The "Altax" is a high temperature accelerator, the dibutyl amine is a booster accelerator, the zinc oxide is an activating filler, the stearic acid is a stabilizer, and the coal tar and rosin help in handling the product on the rolls of the mill and are organic plasticizing agents, facilitating or speeding up the plasticizing effect of the mill rolls upon the synthetic and hence the latter is more readily made receptive of the abrasive grains.

Grinding wheels made with the ingredients of Example I according to the method heretofore outlined are resilient due to the small amount of sulphur, that is to say, readily deformable. Nevertheless this resiliency does not approach extreme flexibility; the product is also fairly tough. Its toughness makes for good grain-holding during deformation of the wheel as well as during the grinding action. One important feature of the wheel of Example I is that it is very strong. The above mentioned toughness and this strength of the grinding wheel I attribute to the character of the coaction or reaction between the synthetic and the bond-improving filler which in the illustration is in the form of finely divided carbon, for its use in relatively large proportion has a different effect upon the bond strength and toughness than the effect on a rubber bond of the same proportion of such filler. Soft rubber bonded wheels have been too weak and frequently burst. Wheels according to the present invention can stand an angular velocity as high as 12,000 surface feet per minute. Roughly speaking, the bursting stress of a wheel due to centrifugal force is constant per unit of diametrical cross section for a given velocity measured in surface feet per minute at the periphery regardless of the actual diameter of the wheel within certain limits. Eight thousand surface feet per minute is adequate for many practical grinding operations. A resilient or flexible rubber grinding wheel of the same elastic limit as the wheel of Example I would not withstand an angular velocity equal to 12,000 surface feet per minute. The grinding wheel made according to Example I is sufficiently deformable so that re-entrant angles in a piece of steel can readily be ground and all sorts of dies, fixtures, automobile parts etc. can be ground that could not be ground with a rigid grinding wheel without danger of taking off more metal in certain spots than might be desired. There is a real need for an effective grinding wheel which will conform to the work being ground and give a fairly uniform grinding action over an irregular surface and wheels made according to Example I fulfill this need.

The invention has also been embodied in rigid wheels, as follows:

*Example II*

| Ingredient | Parts by weight |
|---|---|
| Fused alumina, No. 16 grit size | 400 |
| "Perbunan" | 27.5 |
| Rubber (smoked sheet) | 27.5 |
| Sulphur | 18 |
| Zinc oxide | 25 |
| Cryolite | 15 |
| Calcium oxide | 5 |

In Example II the zinc oxide serves the same purpose as in Example I. The cryolite is a useful filler which improves the grinding action, while calcium oxide is a dehydrating agent to remove occluded water and prevent swelling during the cure. The method of procedure is the same as for the manufacture of a resilient rubber wheel excepting that vulcanizing may be carried out at 150° C. for eight hours.

Another grinding wheel was made as follows:

*Example III*

| Ingredient | Parts by weight |
|---|---|
| Fused alumina, No. 16 grit size | 400 |
| "Perbunan" | 13.75 |
| Rubber | 41.25 |
| Sulphur | 18 |
| Zinc oxide | 25 |
| Cryolite | 15 |
| Calcium oxide | 5 |

This wheel was compounded and cured the same as the wheel of Example II. For comparison purposes, a wheel was made like the wheel of Examples II and III but containing 55 parts of rubber with no "Perbunan." This wheel will be designated wheel A.

Still another wheel was made as follows:

*Example IV*

| Ingredient | Parts by weight |
|---|---|
| Fused alumina, No. 16 grit size | 400 |
| "Perbunan" | 22.5 |
| Rubber | 22.5 |
| Sulphur | 15 |
| Cryolite | 45 |
| Zinc oxide | 5 |
| Calcium oxide | 5 |

This wheel was similarly compounded and similarly cured.

Another wheel was made as follows:

*Example V*

| Ingredient | Parts by weight |
|---|---|
| Fused alumina | 400 |
| "Perbunan" | 11.25 |
| Rubber | 33.75 |
| Sulphur | 15 |
| Cryolite | 45 |
| Zinc oxide | 5 |
| Calcium oxide | 5 |

This wheel was compounded and cured the same as each of the wheels of Examples II, III and IV and wheel A.

Still another wheel was made like the wheel of Example V excepting that 45 parts of rubber was used instead of 11.25 parts of "Perbunan" and 33.75 parts of rubber. This wheel, hereinafter designated as wheel B, was made for comparison purposes.

As indicating the results of using "Perbunan," which as aforesaid, is a copolymer of butadiene and acrylic nitrile vulcanized with sulphur, in a grinding wheel, a comparison was made of wheels of Examples II to V inclusive and wheels A and B in a regular grinding test using a swing frame grinder. The wheels A and B are standard snagging wheels and both of them together with the wheels of Examples II to V inclusive were 16 inches in diameter by 2½ inches in thickness with a 6 inch central hole. The machine was a 16 inch swing frame grinding machine, the wheel speed for each wheel was adjusted to 9500 surface feet per minute, the pressure used was 130 lbs., the material was 18.8 Allegheny steel having a surface of 6" x 24", each run was fifteen minutes, there were five runs per wheel, and the grinding was done on the side with the wheel tilted. The results were as given in the following table:

Table I

| Wheel identification | Wheel wear in cu. in. per hour | Material removed in lbs. per hour |
|---|---|---|
| Wheel A | 49 | 22 |
| Wheel of Example II | 36.8 | 18.6 |
| Wheel of Example III | 41.2 | 19.5 |
| Wheel B | 50.0 | 22.4 |
| Wheel of Example IV | 31.0 | 17.4 |
| Wheel of Example V | 36.3 | 20.0 |

The quality of a grinding wheel depends upon many factors, and especially on what results are desired. It can be easily understood that if a given factory is getting the best results from a given grinding wheel and wages are doubled, a different grinding wheel may be desired. Using prevailing scales of wages and if overhead is 100% of labor, you can obtain a quality number for grinding wheels for snagging purposes by squaring the material removed and dividing by the wheel wear. However, probably because of labor differential and possibly for some other reasons, certain factories desire grinding wheels with a low rate of wheel wear. The above figures show that all of these wheels have quality numbers which may be tabulated as between 16 and 20 which is not too much difference. Specifically, the quality numbers calculated by the above formula using a certain constant was as follows:

Table II

Wheel A _____ 18
Wheel of Example II _____ 17
Wheel of Example III _____ 16
Wheel B _____ 18
Wheel of Example IV _____ 17
Wheel of Example V _____ 20

The replacement of rubber, therefore, with "Perbunan" made little change in quality, it being seen that both the best and the worst wheel from the standpoint of quality number contained some "Perbunan." However, increasing amounts of "Perbunan," as shown in Table I, reduced the wheel wear. This shows another distinguishing characteristic of the bond structure of hard or rigid wheels of my invention over the bond structure of known hard rubber bonded grinding wheels and shows that when the butadiene polymers and copolymers of the bond are vulcanized to rigidity or hardness, their physical structure and action in holding the abrasive grains during the severe conditions of grinding are different and superior and these differences I attribute, as is borne out by the above comparative tests and by comparative examinations, to the fact that these bonding polymers and copolymers, when vulcanized to the hard state, have physical characteristics more closely approximating those of cured or matured hardened resins, which have desirable qualities of strength and brittleness whereas rubber bonds for abrasives, when vulcanized to the hard state, are by comparison deficient in the quality of brittleness or frangibility, the hardened rubber bond tending to retain the characteristic of being "rubbery" although hard. As is later pointed out, the butadiene (polymers and copolymers) bond structures of my invention, in relatively hard grinding wheels, soften at a higher temperature than does the hard "rubbery" bond of hard rubber bonded wheels, and this distinction further demonstrates the just mentioned qualities of strength and brittleness in which, at comparable temperatures, hard rubber bonds are therefore deficient. The wheels of Table I were snagging wheels and in the above described swing frame grinding machine have to be operated dry so that, in the resultant absence of a liquid coolant, the temperature effects at the grinding line have full play and are of severe intensity; the rubber bonded wheels A and B had the highest wheel wear at the rate of 49 to 50 units per hour whereas the wheels of Examples II and IV had a wheel wear from 25% to 40% less. Grinding wheels with a low rate of wheel wear are definitely desired in many factories provided the amount of material removed does not drop too low. Accordingly for such purposes grinding wheels having butadiene products substituted for rubber in whole or in part are definitely found to be desirable and superior.

Another feature of butadiene products is that they have greater heat resistance than rubber products since, for example, vulcanized "Perbunan" softens at a higher temperature but when embodied in bonded abrasive structures as in my invention, the effects, as shown by the above comparative data, are unexpectedly of different character and magnitude. Despite their many excellent qualities rubber bonded grinding wheels have been limited in their application by reason of the low thermal resistance of the rubber, probably also because the above-mentioned "rubbery" though hard character of hard rubber bonded wheels lends itself more readily and at low temperatures to conversion into soft or plastic constituency. Accordingly it is distinctly advantageous to produce a grinding wheel which has many of the characteristics of rubber bonded grinding wheels, the bond of which does not soften until temperatures higher than those which soften rubber bonds are reached. As above noted, the relatively hard bonded grinding wheels of my invention achieve this and other advantages because their bond structures vulcanize to a bond-holding strength and brittleness so different in physical character from the "rubbery" though hard characteristic of hard rubber bonded wheels that, at comparable or the same temperatures, the bond structures of my invention function differently and better than that of a hard rubber bonded grinding wheel; the superior strength and the brittleness of the bonded abrasive structures of my invention can also be accounted for, in part at least, by the different cross-linking behavior of the butadiene compounds as compared to that of rubber, when undergoing vulcanization and is probably due to the fact that the cross-linkages effected during the vulcanization of the molded abrasive article of my invention are more numerous and manifold than is the case with rubber, and when the butadiene copolymers are employed, being, as earlier above noted, linkages between butadiene and the vinyl compound with which it is copolymerized, the cross-linking during vulcanization is probably correspondingly enhanced or multiplied. As a result the vulcanized bond structure may be said in that manner to approximate matured infusible synthetic cross-linked resins rather than to approximate hard vulcanized rubber. A resin bonded grinding wheel has desirable bond structure characteristics from the viewpoint of brittleness or frangibility, lacking in the hard rubber bonded wheel because of its above-mentioned "rubbery" though hard structure, whereas the grinding wheels of my invention avoid such and other deficiencies of the hard rubber bonded wheel and approximate substantially certain desirable properties of the resin bonded wheel without having its disadvantages either as to structure, action, uses or methods of manufacture.

In the wheels of Examples II to V as well as in wheels A and B, cryolite is included as a filler, being known as useful, when employed in hard rubber bonded wheels, in improving the resistance of such wheels to heat. The marked effect of the bond structures of my invention in giving the grinding wheels a materially greater capacity to withstand temperature effects is borne out by an analysis of the compositions of the examples above given and of the hard rubber bonded wheels A and B and their respective performances as given in Table I. Wheel A and the wheels of Examples II and III included the same number of units, namely, 15 of cryolite; the wheel of Example II, containing a larger proportion of Perbunan than the wheel of Example III, achieved a reduction in wheel wear as against the 49 units of wheel wear of wheel A of about 20%, the wheel of Example III containing a lesser proportion of Perbunan achieving a reduction in wheel wear of about 17%. Wheel B and the wheels of Examples IV and V also contained the same amount of cryolite, namely, 45 units each and hence three times as much as in wheel A and the wheels of Examples II and III, yet the wheel wear of the wheel of Example IV containing the larger proportion of Perbunan was about 40% less than the wheel wear of the rubber bonded wheel B and the wheel wear of the wheel of Example V containing a lesser proportion of Perbunan was about 27% less. These comparisons show that with the same or comparable cryolite content, the wheels of my invention are superior to hard rubber bonded wheels and that, whereas trebling the amount of cryolite had little effect on the hard rubber bonded wheels A and B (49 and 50 units, respectively) it had an unexpected and material effect in wheels of the bond structure of my invention, showing in turn that there must be present some different action or coaction between the cryolite and the butadiene bond structures of my invention. In the latter, as the figures show, these elements seem to have a multiplying effect, rather than an additive effect, upon one another in improving the capacity of wheels to withstand grain-releasing deformation of the bond structure and the severe conditions of test. For example, using 45 units of cryolite in the wheel of Example IV as against the 15 units of cryolite in the wheel of Example II, both wheels having the same proportion of vulcanized butadiene compound in the bond structure, resulted in reducing the wheel wear from 36.8 units to 31 units whereas a similar increase in the units of cryolite in the rubber bonded wheel B over the units of cryolite in the rubber bonded wheel A made no material difference in wheel wear, being respectively 50 and 49 units. On the other hand, increasing the amount of butadiene compound while retaining the same units of cryolite (Examples II and III or IV and V) shows the great decrease in wheel wear effected by the character of the bond structures of my invention. These comparative data will thus be seen to emphasize the superiority of the bonded abrasive structures of my invention not merely over rubber-bonded grinding wheels but rather over rubber-bonded grinding wheels whose bond structures have been given improved heat-resistance by the use therein of cryolite.

Probably one of the reasons for the excellent results often achieved with rubber bonded wheels is the presence of sulphur. Sulphur appears to have some action at the grinding line of a chemical nature which prevents loading. In particular, I believe that the presence of sulphur at the grinding line makes the ferrous metal chips brittle so that they do not load the wheel as readily as they otherwise would. Sulphur, therefore, appears to be an excellent filler for a grinding wheel for grinding ferrous metals. The presence of sulphur in rubber bonds was fortuitous and due to the fact that it was necessary to use sulphur to convert the rubber into a usable product. According to the present invention I compound a grain-bonding structure which is also vulcanizable with sulphur but which, in having a different and higher thermal resistance than vulcanized rubber-bonded wheels, is superior to the latter for many practical abrading purposes including even the severe temperature conditions of dry "snagging" as shown for example by the above comparative test data.

There may be enough occluded water in the butadiene abrasive products herein mentioned to cause some swelling during the cure. Calcium oxide CaO readily takes up water at temperatures above 100° C. and becomes converted to calcium hydroxide Ca(OH)$_2$. However, other dehydrating agents may be used, such as activated alumina, silica gel, and soluble anhydrite, CaSO$_4$.

It will thus be seen that there has been provided by this invention an article in which the various objects herein above set forth together with many thoroughly practical advantages are successively achieved. As many possible embodiments may be made of the above invention and as many changes might be made in the embodiment above set forth, it is to be understood that all matter hereinbefore set forth is to be interpreted as illustrative and not in a limiting sense.

I claim:
1. An abrasive product comprising abrasive grains bonded with sulphur vulcanized butadiene copolymerized with another compound selected from the group consisting of vinyl and methyl vinyl compounds.
2. A resilient grinding wheel comprising abra- sive grains bonded with sulphur vulcanized butadiene copolymerized with another compound selected from the group consisting of vinyl and methyl vinyl compounds, the amount of sulphur being not more than 10% of the butadiene.

3. An abrasive product comprising abrasive grains bonded with sulfur vulcanized butadiene copolymerized with acrylic nitrile.

4. An abrasive product comprising abrasive grains bonded with sulfur vulcanized butadiene copolymerized with methyl acrylic nitrile.

5. An abrasive product comprising abrasive grains bonded with sulfur vulcanized butadiene copolymerized with styrene.

6. A substantially rigid abrasive article comprised of abrasive particles and a polymer of butadiene and acrylic nitrile which is vulcanized with a large percentage of sulphur.

7. A resilient grinding wheel comprised of abrasive grains distributed throughout and held by a bond structure comprising the vulcanized bond-forming reaction product under heat treatment of butadiene compound selected from the group consisting of (1) butadiene polymer and (2) butadiene copolymer comprising butadiene copolymerized with another compound selected from the group consisting of vinyl and methyl vinyl compounds, with a low percentage of sulphur, not more than about 10% of the butadiene compound, reacted therewith under the heat treatment to effect vulcanization to a state of resiliency, said bonding reaction product having interspersed therethrough a bond-improving filler comprising carbon black in comminuted form, said filler being present in relatively high percentage in relation to the butadiene compound and giving the bond structure a toughness to retain and hold the abrasive grains strongly under wheel deformation and to give the wheel improved resistance to stresses caused by centrifugal forces.

8. A rigid grinding wheel comprised of abrasive grains distributed throughout and held by a bond comprising the vulcanized reaction product under heat treatment of a butadiene compound selected from the group consisting of (1) butadiene polymer and (2) butadiene copolymer comprising butadiene copolymerized with another compound selected from the group consisting of vinyl and methyl vinyl compounds, with a relatively large percentage of sulphur reacted therewith under vulcanizing heat treatment to form a substantially rigid grain-holding bond structure having a materially greater capacity to withstand grain-releasing deformation under comparable grinding temperatures than a comparably vulcanized rubber-bonded abrasive article.

9. A rigid grinding wheel comprised of abrasive grains distributed throughout and held by a bond comprising the vulcanized reaction product under heat treatment of a butadiene compound selected from the group consisting of (1) butadiene polymer and (2) butadiene copolymer comprising butadiene copolymerized with another compound selected from the group consisting of vinyl and methyl vinyl compounds, with a relatively large percentage of sulphur reacted therewith under vulcanizing heat treatment, in admixture with a filler having heat-resistance-improving properties, to form a substantially rigid grain-holding and filler-holding bond structure that has a materially greater capacity to withstand grain-releasing deformation under comparable grinding temperatures than a comparably vlulcanized rubber-bonded abrasive article.

10. An abrasive article comprising abrasive grains adhered to and held together by a bond structure that comprises the vulcanized reaction product with sulphur as a vulcanizing agent of a butadiene compound selected from the group consisting of (1) butadiene polymer and (2) butadiene copolymer comprising butadiene copolymerized with a compound selected from the group consisting of vinyl and methyl vinyl compounds, and an organic plasticizing agent initially present in an amount to give the butadiene compound improved workability and thereby mitigate, during working, tendency of the butadiene compound to resist envelopment of and adhesion to the abrasive grains and thereby contribute grain-retentive plasticity thereto, the resultant bond structure thereby having the abrasive grains substantially uniformly distributed therethrough and substantially uniformly enveloping and securely holding said abrasive grains.

11. A substantially rigid abrasive article comprised of abrasive particles and a polymer of butadiene and styrene which is vulcanized with a large percentage of sulphur.

12. A substantially rigid abrasive article of improved capacity to withstand heat produced by its grinding action, comprised of abrasive grains and a bond structure therefor comprising a polymer of butadiene and acrylic nitrile which is vulcanized with a large percentage of sulphur and in admixture with cryolite, the vulcanized polymer and the cryolite coacting to give the bond structure substantial immunity against detrimental distortion under temperature effects of grinding in a measure, as compared to a comparably vulcanized rubber-bonded abrasive article, greater than the sum of the effect of the vulcanized polymer alone and the effect of the cryolite alone.

13. A substantially rigid abrasive article of improved capacity to withstand heat produced by its grinding action, comprised of abrasive grains and a bond structure therefor comprising a polymer of butadiene and styrene which is vulcanized with a large percentage of sulphur and in admixture with cryolite, the vulcanized polymer and the cryolite coacting to give the bond structure substantial immunity against detrimental distortion under temperature effects of grinding in a measure, as compared to a comparably vulcanized rubber-bonded abrasive article, greater than the sum of the effect of the vulcanized polymer alone and the effect of the cryolite alone.

14. A substantially rigid abrasive article of improved capacity to withstand heat produced by its grinding action, comprised of abrasive grains and a bond structure therefor comprising a polymer of butadiene which is vulcanized with a large percentage of sulphur and in admixture with cryolite, the vulcanized polymer and the cryolite coacting to give the bond structure substantial immunity against detrimental distortion under temperature effects of grinding in a measure, as compared to a comparably vulcanized rubber-bonded abrasive article, greater than the sum of the effect of the vulcanized polymer alone and the effect of the croylite alone.

SAMUEL S. KISTLER.